United States Patent
Vere et al.

(10) Patent No.: US 9,592,626 B2
(45) Date of Patent: Mar. 14, 2017

(54) METHOD FOR MAKING AN IMPRINT ON AN ARTICLE

(75) Inventors: Denis Vere, Argentre du Plessis (FR); Aurélie Barbotin, Noyal sur Vilaine (FR)

(73) Assignee: OBERTHUR TECHNOLOGIES, Levallois Perret (FR)

( * ) Notice: Subject to any disclaimer, the term of this patent is extended or adjusted under 35 U.S.C. 154(b) by 80 days.

(21) Appl. No.: 13/159,389

(22) Filed: Jun. 13, 2011

(65) Prior Publication Data
US 2011/0303112 A1    Dec. 15, 2011

(30) Foreign Application Priority Data

Jun. 11, 2010 (FR) ..................... 10 54641

(51) Int. Cl.
*B29C 43/20* (2006.01)
*B29C 43/18* (2006.01)
*B41M 3/14* (2006.01)
*B41M 5/26* (2006.01)

(52) U.S. Cl.
CPC ............ *B29C 43/18* (2013.01); *B29C 43/203* (2013.01); *B41M 3/14* (2013.01); *B41M 5/26* (2013.01); *B29C 2043/182* (2013.01); *B41M 5/262* (2013.01); *B41M 5/267* (2013.01); *Y10T 428/24802* (2015.01)

(58) Field of Classification Search
CPC .............. B29C 43/206; B29C 43/203; B29C 2043/182
See application file for complete search history.

(56) References Cited

U.S. PATENT DOCUMENTS

| | | | |
|---|---|---|---|
| 3,614,839 A | | 10/1971 | Thomas |
| 3,802,101 A | * | 4/1974 | Scantlin ..................... 283/87 |
| 4,318,554 A | | 3/1982 | Anderson et al. |
| 4,425,421 A | * | 1/1984 | Rutges et al. ............. 430/238 |
| 4,773,677 A | * | 9/1988 | Plasse .................. B42D 25/00 156/293 |
| 4,988,126 A | | 1/1991 | Heckenkamp et al. |

(Continued)

FOREIGN PATENT DOCUMENTS

GB    1576168 A  * 10/1980

OTHER PUBLICATIONS

Coefficients of Linear Expansion [online]. The Engineering Toolbox [retrieved on Jun. 12, 2013]. Retrieved from the Internet: <URL: http://www.engineeringtoolbox.com/linear-expansion-coefficients-d_95.html>.*

*Primary Examiner* — Matthew Daniels
(74) *Attorney, Agent, or Firm* — Cozen O'Connor

(57) ABSTRACT

An imprint (18) that represents a predefined pattern on an article. Article (10) comprises a body (12) made of a first material with a first thermal expansion coefficient (C1). The method comprises a step of incorporating a piece (22) in body (12) made of a second material with a second thermal expansion coefficient (C2), lower than the first coefficient, a step of heating article (10) to a predefined temperature to induce expansion of the materials, and then a step of cooling article (10) to induce shrinkage of the materials, generating a mechanicals stress that deforms article (10). Piece (22) is shaped so that the deformation generated corresponds to predefined pattern (20).

27 Claims, 3 Drawing Sheets

(56) References Cited

U.S. PATENT DOCUMENTS

| | | | | |
|---|---|---|---|---|
| 5,817,207 | A | * | 10/1998 | Leighton .......... G06K 19/07718 |
| | | | | 156/298 |
| 6,036,099 | A | * | 3/2000 | Leighton ............... B32B 37/185 |
| | | | | 156/154 |
| 6,245,167 | B1 | * | 6/2001 | Stein ........................ B30B 7/02 |
| | | | | 156/228 |
| 6,322,655 | B1 | | 11/2001 | Casagrande |
| 2004/0117317 | A1 | * | 6/2004 | Feinman .............. G06Q 20/341 |
| | | | | 705/65 |
| 2007/0182154 | A1 | | 8/2007 | Hoeppner et al. |

* cited by examiner

METHOD FOR MAKING AN IMPRINT ON AN ARTICLE

RELATED APPLICATIONS

This application claims the priority of French application no. 10/54641 filed Jun. 11, 2010, the entire content of which is hereby incorporated by reference.

FIELD OF THE INVENTION

The present invention concerns the technical field of articles provided with an imprint representing a predefined pattern, notably for their identification or their authentication. It thus concerns a method for creating an imprint representing a predefined pattern on an article and an article comprising an imprint created by means of such a method.

It applies more precisely, but not exclusively, to the creation of an imprint on a security document or a valuable document or any document whose authenticity needs to be verified. It preferably applies to flat articles with a thickness less than one millimeter, such as, for example, chip cards.

BACKGROUND OF THE INVENTION

In order to combat counterfeiting, these documents generally comprise a combination of security elements consisting of, for example, a particular composition of a material making up a document medium, a security insert incorporated in the medium (electronic chip, security strip, etc.), and an embossed or imprinted pattern on the medium, etc. Of course, this list is not exhaustive.

Making an imprint describing an embossed pattern on a chip card is especially known. This embossed pattern can be formed by embossing by means of a press, by intaglio printing or possibly by surface treatment with a laser beam.

The disadvantage of these imprints is that they are superficial, and are thus more exposed to willful damage for purposes of falsifying the document, for example by scraping. Moreover, such superficial imprints, made by embossing, for example, are relatively simple to reproduce.

SUMMARY OF THE INVENTION

One object of the invention is to provide a method for creating an imprint on an article that is difficult to falsify while being simple to create.

To this end, one aspect of the invention relates to a method for creating an imprint representing a predefined pattern on an article comprising a body made of a first material at a first thermal expansion coefficient, wherein the method comprises a step of incorporating in the body a piece made from a second material with a second thermal expansion coefficient, less than the first coefficient, a step of heating the article to a predefined temperature to induce expansion of the materials, and then a step of cooling the article to induce shrinkage of the materials, generating a mechanical stress that causes the article to deform, the piece being shaped so that the deformation generated corresponds to the predefined pattern.

According to an embodiment of the invention, the imprint forms a relief whose appearance is determined by an element internal to the article, i.e., the piece. The imprint is thus completely inherent to the manufacture of the article and is impossible to reproduce once the article is manufactured.

The deformation related to these expanding and shrinking mechanical stresses is characterized by a subtle relief that is very difficult to reproduce once the article is manufactured. In fact, to create this imprint, it is necessary to incorporate a piece in the body of the article then subject the assembly to heating followed by cooling, for example.

"First high thermal expansion coefficient" and "second low thermal expansion coefficient" mean that the value of the first coefficient is higher than the value of the second coefficient.

Preferably, the first material essentially consists of plastic. The advantage of using plastic is that such a material is easily deformable.

In one preferred embodiment, the second material essentially consists of metal. As a variant, the second material essentially consists of plastic.

In one preferred embodiment, the second material is a glaze and the piece is formed by a glaze film.

Preferably, at the predefined temperature, the body is in a state that allows it to wind around the piece. Thus, in this case, the stresses experienced during shrinkage are optimized because there is a maximum contact surface between the piece and the body.

For example, the predefined temperature essentially corresponds to a state change temperature for the first material, for example, a glass transition temperature.

In one preferred embodiment, the body comprises a neutral fiber sheet and the piece is offset with regard to this sheet. Thus, the mechanical stresses experienced by the article during the cooling step are distributed unequally on either side of the sheet, which generates a relatively pronounced deformation.

In one preferred embodiment, the body is in the general form of a plate defining first and second faces and the first material is fairly homogenous; the neutral fiber sheet forms a plane located more or less in the center of the body.

Preferably, since the body is formed of several layers, in order to incorporate the piece, it is interspersed between two layers of the body. Thus the step of incorporating the piece is relatively easy to implement due to the fact that the article is initially in the form of several distinct layers separate from one another.

In one preferred embodiment, since the second material is a glaze, in order to incorporate the piece, the glaze is deposited on one of the layers of the body.

Preferably, during the heating step, the article is subjected to a predefined pressure in order to induce the layers of the body to be laminated together. This lamination step allows the first material of the body of the article to flow around the piece incorporated in the body.

Preferably, in order to obtain a sufficiently great deformation, the coefficient of the first material is at least twice as high as the coefficient of the second material.

Preferably, the imprint is perceptible to the naked eye under predefined observation conditions, for example by oblique reflective observation. For example, the imprint is almost imperceptible by observation orthogonal to the support.

Preferably, the piece has the general shape of a predefined pattern.

Preferably, the imprint is perceptible to the naked eye and can be shown by reflection observation.

Another aspect of the invention relates to an article comprising a body provided with an imprint, wherein the imprint is created by means of a method according to an embodiment of the invention.

Preferably, the article is a chip card comprising an electronic circuit that can perform a collection of operations, in which the piece is insulated electrically from the circuit.

Thus, the piece does not have electronic functions and is only intended to produce an imprint in the body of the card.

Another aspect of the invention relates to a method intended to allow authenticating an article conforming to an embodiment of the invention, wherein the method comprises a step of acquiring an image of said imprint by an acquisition device that can measure a relief.

DETAILED DESCRIPTION OF THE DRAWINGS

Figure 1:
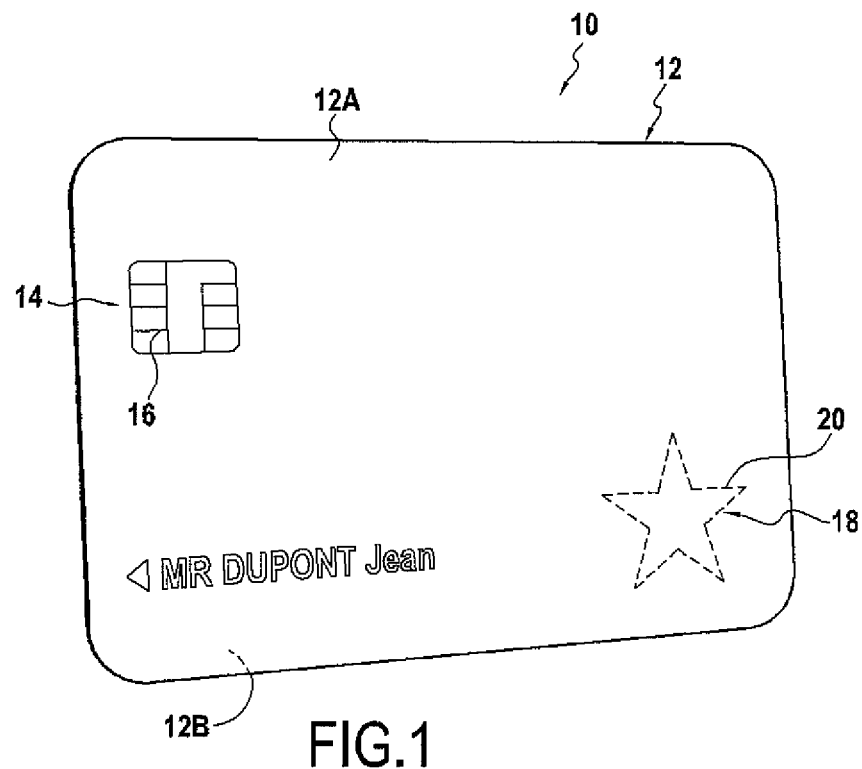
FIG. 1 shows an article, such as a chip card provided with an imprint, imperceptible to the naked eye, created by a method according to a first embodiment of the invention.

FIG. 1 shows an article according to a first embodiment of the invention. This article is designated by the general reference 10.

Article 10 is a chip card, such as a bank card, in the example described. As a variant, article 10 can be a security document, such as an identity card, a laminated passport page, etc.

Card 10 comprises a card body 12 defining a first face 12A and a second face 12B. One of the faces, first face 12A, for example, has personal data such as the surname and first name of the bearer, or even authentication data such as a bank card number, a validity date, etc.

In this example, card body 12 is made of a first material defined by a first thermal expansion coefficient C1. Preferably, the first material is plastic.

The plastic mainly consists of, for example, polycarbonate (PC). The first thermal expansion coefficient C1 is, for example, $6.5 \cdot 10^{-5}$ $K^{-1}$. In a variant, the first material can mainly comprise polyvinyl chloride (PVC) or PET (polyethylene terephthalate).

In the example described, card body 12 defines the outer dimensions of card 10. Preferably, the dimensions of card 10 are defined by the ID-1 format of standard ISO 7816 that is the format conventionally used for bank cards. Card body 12 thus has the following dimensions in this example: 85.60× 53.98 mm and a thickness of 0.76 mm. Of course, other card formats may be suitable.

In the example described, card 10 is dual. Thus, card comprises a microcircuit module 14 provided with an outer contact area 16 flush with the surface of card body allowing communication with contact by means of an external card reader (not shown). Moreover, card 10 comprises, for example, a near-field communication antenna (not shown) electrically linked to the module microcircuit at the microcircuit and allowing establishing contactless communication with an external card reader (not shown).

In one non-illustrated variant, card 10 can be a contactless card, i.e., only permitting communication without contact. In this case, card 10 does not have external contacts and microcircuit module 14 is entirely incorporated in card body 12. In another still non-illustrated variant, card 10 can be a contact card, i.e., only permitting communication with contact.

Card 10 also comprises an imprint 18 representing a predefined pattern 20. This imprint 18 is formed by a deformation of one of the faces of card 10, in the present case, first face 12A. Predefined pattern 20 has, in the example illustrated in FIGS. 1 and 2, the general shape of a star. As a variation, pattern 20 can have any geometric shape at all, such as a square, a diamond, a circle, etc., or even a shape representing an object, a logo, a country, etc. In one preferred embodiment, pattern 20 represents data supplementing the security and personal data.

In order to obtain this deformation and thus form imprint 18, body 12 incorporates a piece 22 made in a second material, different from the first, with a second thermal expansion coefficient C2.

Conforming to the invention, the first thermal expansion coefficient C1 is higher than the second thermal expansion coefficient C2.

More precisely, the first coefficient C1 is called high, as opposed to the second coefficient C2 called low, because the first coefficient has a value greater than the second coefficient. Thus, preferably, the value of first coefficient C1 is at least twice as high as the value of the second coefficient C2. In the example described and preferably, first coefficient C1 has a value three times as high as second coefficient C2.

The second material is, for example, metal. In the example described, the second material mainly consists of copper, whose thermal expansion coefficient is $1.7 \cdot 10^{-5}$ $K^{-1}$. As a variant, the second material can mainly consist of nickel, which has a thermal coefficient of $1.3 \cdot 10^{-5}$ $K^{-1}$.

Preferably piece 22 is made in a mass of a second material, essentially homogenous. Moreover, for example, piece 22 does not have electronic functions. Piece 22 is, for example, electrically insulated from any electronic circuit (especially the microcircuit) incorporated in card 10.

More particularly, the difference of coefficients C1 and C2 between the two materials permits generating mechanical stress when card 10 is subject to thermal variations. This mechanical stress is rendered visible by the appearance of a surface deformation.

Thus card 10 is subject to a heating step to a predefined temperature to induce expansion of the materials and then a cooling step to induce shrinkage of the materials.

Preferably, at the predefined temperature, body 12 is in a state that allows it to wind around piece 22.

For example, the predefined temperature corresponds essentially to a state change temperature for the first material, for example, a glass transition temperature.

In particular, piece 22 is shaped so that the deformation generated by this mechanical stress corresponds to predefined pattern 20. Preferably, piece 22 has the general shape of predefined pattern 20. Thus, in this example, to obtain a predefined pattern 22 in the shape of a star, piece 22 has a general star shape.

Figure 2:
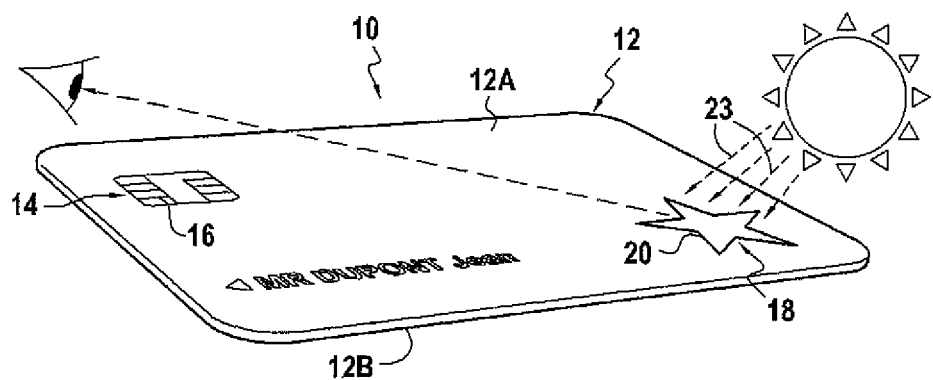
FIG. 2 shows the card of FIG. 1 in which the imprint is revealed by an optical device.

Preferably, imprint 18 is perceptible to the naked eye and can be shown by reflection observation. As is shown in FIG. 2, predefined pattern 20 is observable by reflection, for example, by directing a beam of light 23 onto pattern 20.

It is desirable to direct light beam 23 onto the card so that it forms a predefined angle with the face of the card below a total reflection limiting angle.

Thus, preferably, light beam 23 and the plane of card 10 form a predefined angle θ less than a total reflection limiting angle.

For example, when body 12 is made of polycarbonate or even PVC, the total reflection limiting angle is around 40°. For angles less than this limiting angle, observation by reflection is optimized, while above this limiting angle, light beam 23 is refracted through body 12 of card 10.

Figure 3:
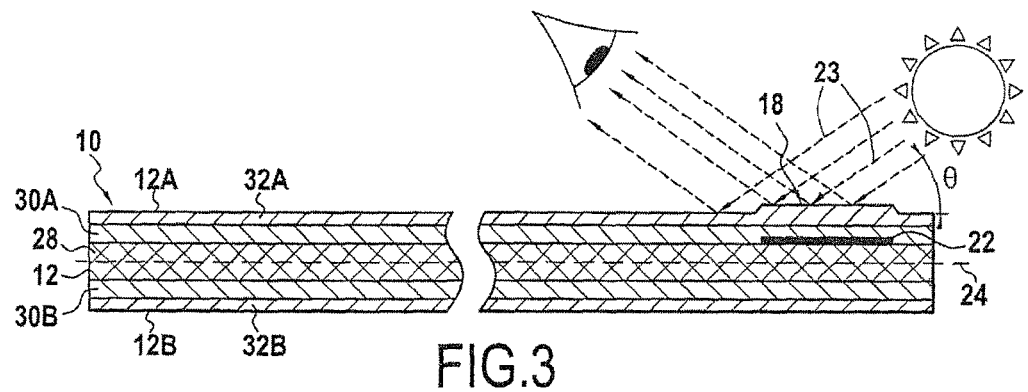
FIG. 3 is a cross-sectional view of the card of FIG. 1 along line 3-3.

As can be seen in FIG. 3, light beam 23 is reflected with a predefined angle less than a total reflection limiting angle. Beyond this limiting angle value, the light beam is no longer reflected, but rather is refracted inside body 12 of card 10.

Thus, due to the surface deformation of the card linked to the presence of the piece, light beam 23 is not reflected uniformly in the direction of observation and a fairly pronounced contrast area appears, representing pattern 20.

Preferably, card body 12 comprises a neutral fiber sheet 24 (dotted line in FIG. 3) and piece 22 is offset with regard to this sheet 24. Neutral fiber sheet means, in the sense of the present invention, the surface inside body for which the mechanical stresses are essentially balanced.

In one preferred embodiment of the invention, body 12 is in the general form of a plate and the first material is fairly homogenous; neutral fiber sheet 24 forms a localized plane more or less in the center of body 12.

Card body 12 is preferably made of several layers. Such a multilayer structure is preferably shaped by lamination of several layers 26. Thus, as can be seen in FIG. 3, card body 12 is formed by superimposing several laminated layers together whose total thickness is about eight hundred micrometers.

Thus, body 12 comprises a central layer 28 about three hundred micrometers thick interspersed between two intermediate layers 30A, 30B, about one hundred and fifty micrometers thick, commonly called "inlay", and on which data are printed, for example. Body 12 also comprises two transparent outer layers 32A, 32B for protecting the data printed on inlay layers 30A, 30B one hundred micrometers thick. These outer layers 32A, 32B are commonly called "overlay".

In this embodiment, the neutral plane is located more or less in the middle of central layer 28. Piece 22 is then preferably arranged above or below this central layer 28 to form a deformation on one or the other of faces 12A, 12B of card body 12. In the example shown in FIG. 3, we see that piece 22 is located between central layer 26 and intermediate layer 28A, opposite face 12A of card body 12. Thus, the deformation generated is present mainly on face 12A of card 12.

As a variant, card body 12 can also be formed by molding or any other appropriate technique. For example, the body is formed by injection of the material into a mold, and the piece is positioned in the mold during the incorporation step and before molding the body.

Figure 6:
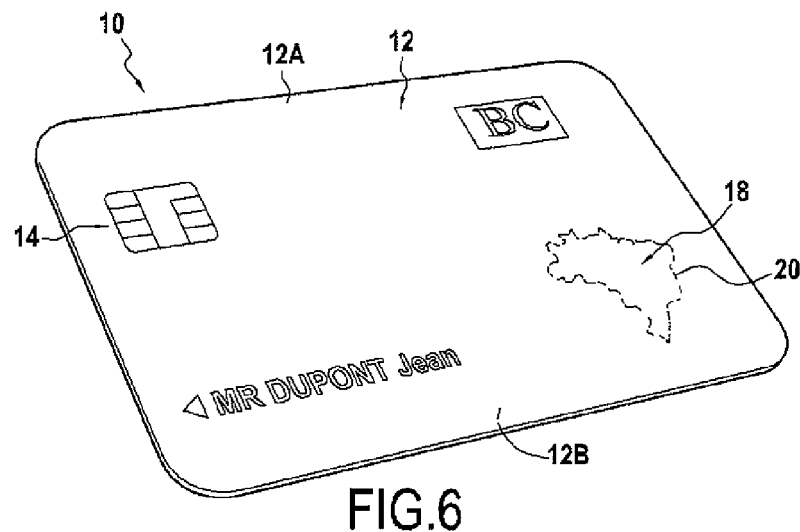
FIG. 6 is a perspective top view of the article of FIG. 1 according to a second embodiment of the invention.
Figure 7:
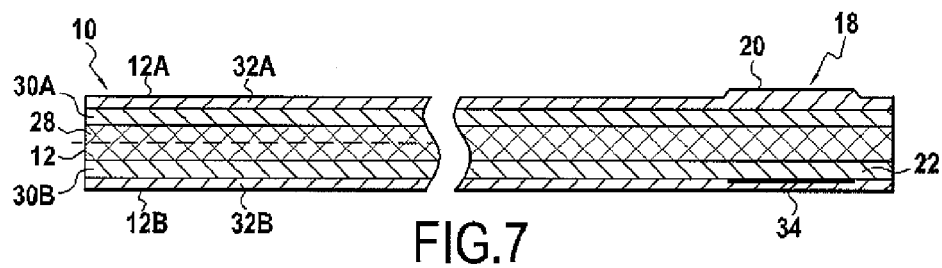
FIG. 7 is a sectional view of the article of FIG. 6.
Figure 8:
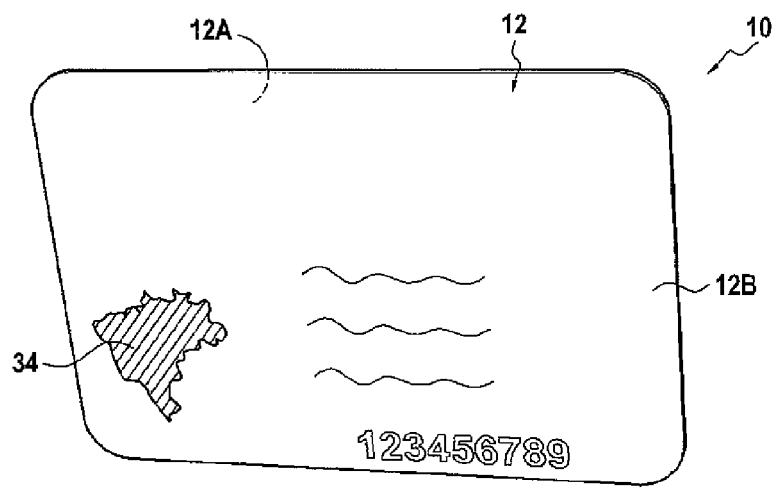
FIG. 8 is a bottom view of the article of FIG. 6.

FIGS. 6 to 8 show an article according to a second embodiment. In these FIGS. 6 to 8, the elements analogous to those of the preceding figures are designated by the same references.

In this second embodiment, the second material is a glaze. Piece 22 is, for example, made by depositing a second material in the form of a film 34.

Generally, a glaze comprises a film-forming agent incorporated in a volatile solvent that evaporates so as to leave only film 34. For example, the film-forming agent is chosen from among polyacrylate polyester, etc. The glaze can be colored or not, for example.

Preferably, the glaze incorporates mineral and/or metal fillers conferring a shiny, iridescent, silver, gold, etc. appearance to the film. For example, the mineral fillers comprise powdered silica or even glass or finely crushed oxides. The metal fillers comprise, for example, copper, aluminum, etc. particles.

As is seen in FIG. 8, preferably, piece 22 is visible by observation from a face 12B of body 12, called observation face, by the translucence of at least layers 26 of body 12 situated between this face 12B and piece 22.

For example, glaze film 34 is deposited between so-called overlay layer 32B and printed layer 30B. Layer 32B is then transparent in this example and film 34 is visible through this layer 32B. Moreover, due to the low thermal expansion coefficient C2 of the second material compared to that C1 of the first material, a deformation can be observed on face 12A opposite observation face 12B.

In the example illustrated in FIGS. 6 to 8, we see that predefined pattern 20 represents the general shape of a country, Brazil here. Of course, other shapes may be suitable, especially shapes representing an object, a logo and even data. The advantage of the glaze is that it can be printed and therefore allows forming an imprint with relatively fine detail.

Figure 4:
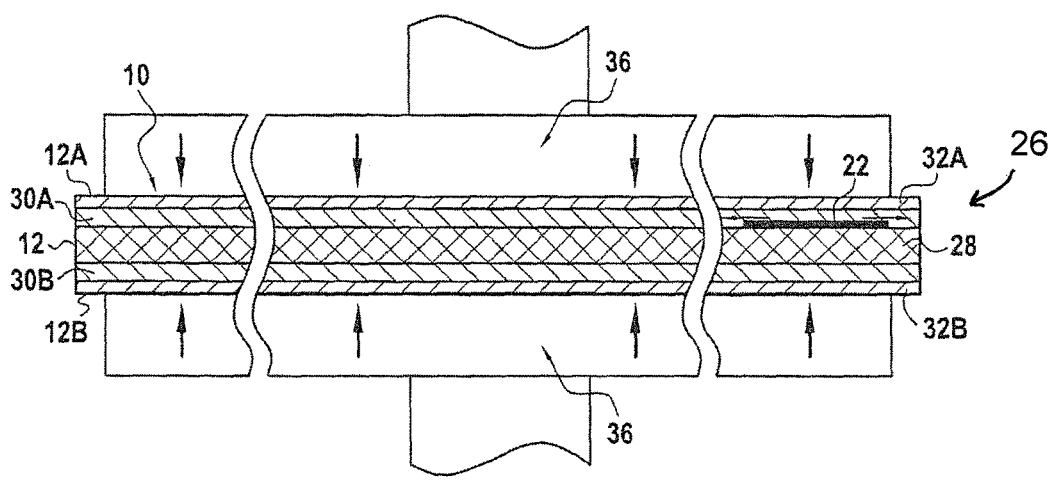
FIGS. 4 and 5 represent steps of the manufacturing process for the card of FIG. 1.
Figure 5:
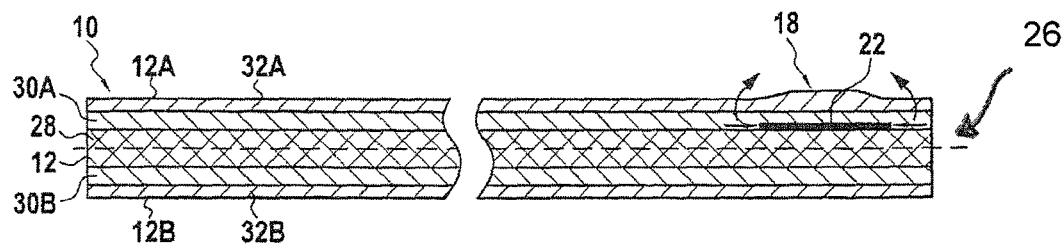

We will now describe the main steps of a method according to the invention in reference to FIGS. 4 and 5 to produce the card according to the first embodiment illustrated in FIG. 1.

Preferably, card 10 is formed by lamination of a stack of layers 26. Thus, for example, during a first step, a stack of layers superimposed on one another is formed. Next, preferably, to incorporate metal piece 22, during the incorporation step, piece 22 is interspersed between two layers of body 12.

In the example described, metal piece 22 is interspersed between at least two of these layers 26 and other card security elements may be incorporated such as, for example, a near-field communication circuit. The location of metal piece 22 in the body is preferably offset with regard to the neutral plane of card body 12 to accentuate the deformation of body 12 by dissymmetry of the mechanical stresses.

As a variant, to produce a card according to the second embodiment, the second material being a glaze, the glaze can be deposited on one of the layers of body 12 to incorporate piece 22.

Next, the assembly is subjected to a third heating step up to a predefined temperature.

Preferably, as is illustrated in FIG. 4, this heating step also corresponds to a lamination step and a pressure is thus simultaneously exerted on the body from either side of its faces to induce the first material making up the layers to flow around piece 22 by means of a press 36.

Thus, the heating temperature is, for example, comprised between 100 to 200° C. and the surface pressure exerted during this step is comprised between 50 to 200 N/cm$^2$ according to the nature of the materials. During this step, the body and the piece expand according to their respective thermal expansion coefficients C1, C2.

Next, during a fourth step, card 10 is allowed to cool, for example at room temperature. Due to the fact that shrinkage of the materials differs, a mechanical stress appears in card 10 illustrated schematically by arrows in FIG. 5 during the cooling step.

In particular, to the right of piece 22, the mechanical stress produces surface deformation. This deformation is almost imperceptible to the naked eye in daylight by frontal observation of card 10, but can be easily revealed by inclining the card with regard to a light beam generated, for example, by a lamp such as illustrated in FIG. 2.

Possibly, an interference optical phenomenon can be observed at the imprint with the naked eye and under particular observation conditions, especially reflection. This optical phenomenon comprises interference fringes that reflect the photoelasticity of body 12 and reveal the internal mechanical stresses. Thus, the mechanical deformation of the top layer transparent to visible light makes it birefringent.

It is well understood that the embodiments that have just been described are not limiting and they can be modified in any desirable way without exceeding the scope of the invention. In particular, the predefined pattern can have any desired form other than those described.

As explained previously, card 10 can be authenticated by observing the imprint with the naked eye. As a variant, card 10 can be authenticated by acquiring an image of the imprint by means of an acquisition device that can measure a relief, for example a profilometer.

The image acquired may be displayed and verified by an operator who compares the imprint displayed with the expected imprint. As a variant, the acquired imprint image is compared with an expected image by a computer.

The invention claimed is:

1. A method for creating an imprint representing a predefined pattern on an article, wherein the method comprises:
   incorporating, in a body made of a first material having a first thermal expansion coefficient, a piece made from a second material having a second thermal expansion coefficient, lower than the first coefficient, the piece having the general shape of the predefined pattern and having contact surfaces with the body, said body defining first and second opposite outer faces, wherein the body is formed of a plurality of layers and during the incorporating step, the piece is interspersed between two layers of the body, and wherein the piece does not have electronic functions;
   heating the body and the piece to a predefined temperature to induce expansion of the first and second materials;
   exerting pressure on the heated body and the piece from one or both of the first and second faces of the body; and
   then cooling the body and the piece to induce shrinkage of the expanded first and second materials so as to produce mechanical stress in the body at an outer edge of the piece, the mechanical stress producing a surface deformation to one of the first and second outer faces located in correspondence with the position of the piece, wherein the cooling is performed by allowing the body and the piece to cool at room temperature,
   wherein the surface deformation is configured to be observed by light reflected at an angle less than a total reflection limiting angle with respect to a corresponding one of the first and second outer faces.

2. The method according to claim 1, wherein the first material is essentially a plastic.

3. The method according to claim 1, wherein the second material is mainly a metal and/or a plastic.

4. The method according to claim 1, wherein the second material is a glaze and the piece is formed by a glaze film.

5. The method according to claim 1, wherein at the predefined temperature, the body is in a state that allows it to wind around the piece.

6. The method according to claim 1, wherein the predefined temperature essentially corresponds to a state change temperature for the first material.

7. The method according to claim 6, wherein the predefined temperature is a glass transition temperature of the first material.

8. The method according to claim 1, wherein the body comprises a neutral fiber sheet and the piece is offset with regard to this neutral fiber sheet.

9. The method according to claim 8, wherein the body is of the general shape of a plate and the first material is substantially homogenous, the neutral fiber sheet forming a plane located approximately in the center of the body.

10. The method according to claim 1, wherein the second material is a glaze; and in order to incorporate the piece into the body, the glaze is deposited on one of the layers of the body.

11. The method according to claim 1, wherein the exerted pressure is set to a level that induces layers of the body to be laminated together.

12. The method according to claim 1, wherein the thermal expansion coefficient of the first material is at least twice as high as the thermal expansion coefficient of the second material.

13. The method according to claim 1, wherein the body is molded in a mold and the piece is positioned in the mold before the body is molded.

14. The method according to claim 1, wherein flowing of the first material around the piece is induced at the predefined temperature.

15. The method according to claim 1, wherein the exerting of pressure on the body around the piece from one or both of the outer faces of the body is simultaneous to the heating of the body and the piece.

16. The method according to claim 1, wherein the mechanical stress in the body from said at least one contact surface creates the imprint.

17. The method according to claim 1, wherein an interference optical phenomenon is observable at the imprint with the naked eye and under particular reflection.

18. The method according to claim 1, wherein the article is a card having dimensions defined by the ID-1 format of standard ISO 7816.

19. The method according to claim 1, wherein the article is a card comprising a microcircuit module.

20. The method according to claim 19, wherein the microcircuit module is provided with an outer contact area which is flush with the surface of the body.

21. The method according to claim 19, wherein the card comprises a near-field communication antenna electrically linked to the microcircuit module.

22. The method according to claim 19, wherein the microcircuit module is entirely incorporated in the body.

23. The method according to claim 1, wherein the body comprises a central layer, two intermediate layers and two outer layers, the piece being arranged above or below the central layer.

24. The method according to claim 23, wherein the piece is located between the central layer and one of the two intermediate layers.

25. The method according to claim 23, wherein the piece is located between one of the two intermediate layers and the adjacent outer layer.

26. The method according to claim 1, wherein there is at least one intervening layer between the piece and an outer layer comprising one of the first and second outer faces.

27. The method according to claim 1, wherein all of the surface deformation to one of the first and second outer faces produced by the mechanical stress occurs during the cooling step.

* * * * *